(12) United States Patent
Haghighat (10) Patent No.: US 10,810,433 B2
(45) Date of Patent: Oct. 20, 2020

(54) METHOD AND SYSTEM FOR TRACKING OBJECTS

(71) Applicant: COMMUNITIES UNCOMPLICATED INC., Edmonton (CA)

(72) Inventor: Pelman Haghighat, Edmonton (CA)

(73) Assignee: COMMUNITIES UNCOMPLICATED INC., Edmonton (CA)

( * ) Notice: Subject to any disclaimer, the term of this patent is extended or adjusted under 35 U.S.C. 154(b) by 164 days.

(21) Appl. No.: 16/087,456

(22) PCT Filed: Mar. 6, 2017

(86) PCT No.: PCT/CA2017/050303
§ 371 (c)(1),
(2) Date: Sep. 21, 2018

(87) PCT Pub. No.: WO2017/161443
PCT Pub. Date: Sep. 28, 2017

(65) Prior Publication Data
US 2019/0108398 A1    Apr. 11, 2019

Related U.S. Application Data

(60) Provisional application No. 62/311,749, filed on Mar. 22, 2016.

(51) Int. Cl.
*G06T 7/00*     (2017.01)
*G06K 9/00*     (2006.01)
*G06T 7/246*    (2017.01)
*G06K 9/62*     (2006.01)
*G06T 5/00*     (2006.01)
(Continued)

(52) U.S. Cl.
CPC ..... *G06K 9/00718* (2013.01); *G06K 9/00228* (2013.01); *G06K 9/00771* (2013.01); *G06K 9/6276* (2013.01); *G06T 5/002* (2013.01); *G06T 5/40* (2013.01); *G06T 7/246* (2017.01); *G06T 7/248* (2017.01); *G06T 2200/24* (2013.01); *G06T 2207/30201* (2013.01); *G06T 2207/30242* (2013.01)

(58) Field of Classification Search
CPC .................................... G06K 9/00; G06T 7/00
USPC ......................................................... 382/103
See application file for complete search history.

(56) References Cited

U.S. PATENT DOCUMENTS 10,410,046 B2 *   9/2019   Wang ........................ G06T 7/20

OTHER PUBLICATIONS

Yi Wu et al., "Object Tracking Benchmark", IEEE Transactions on Pattern Analysis and Machine Intelligence, vol. 37, No. 9, Sep. 2015, pp. 1834-1848.

(Continued)

*Primary Examiner* — Abolfazl Tabatabai
(74) *Attorney, Agent, or Firm* — Dentons US LLP (57) ABSTRACT

A method and system is provided for tracking one or more objects in a video which is computationally light so that it can run on a variety of computing devices, including mobile devices which typically have a limited computational power. The tracked objects can be selected, and can then be automatically tracked afterwards. The tracked objects can be deselected or have their bounding boxes moved or resized at any time. The tracking can be performed using online learning with a binary classifier to separate the target from the background.

42 Claims, 10 Drawing Sheets

(51) Int. Cl.
  G06T 5/40    (2006.01)
  G06F 3/00    (2006.01)

(56) References Cited

OTHER PUBLICATIONS

S. Hare et al., "Struck: Structured Output Tracking with Kernels", In ICCV, 2011.
Zdenek Kalal et al., "P-N Learning: Bootstrapping Binary Classifiers by Structural Constraints", IEEE Conference on Computer Vision and Pattern Recognition, In CVPR, Jun. 13-18, 2010, pages.
João F. Henriques et al., "Exploiting the Circulant Structure of Tracking-by-detection with Kernels", Institute of Systems and Robotics, University of Coimbra, 14 pages.
Boris Babenko et al., "Robust Object Tracking with Online Multiple Instance Learning", IEEE Transactions on Pattern Analysis and Machine Intelligence (PAMI), vol. 33, No. 7, pp. 1619-1632, 2011.
Xu Jia et al., "Visual Tracking via Adaptive Structural Local Sparse Appearance Model", In CVPR, 2012.
B. D. Lucas et al., "An Iterative Image Registration Technique with an Application to Stereo Vision", Proceedings 7th International I Joint Conference on Artificial Intelligence (IJCAI), Aug. 24-28, 1981, pp. 674-679.
Iain Matthews et al., "The Template Update Problem", IEEE Transactions on Pattern Analysis and Machine Intelligence (PAMI), vol. 26, No. 6, pp. 810-815, 2004.
Gregory D. Hager et al., "Efficient Region Tracking With Parametric Models of Geometry and Illumination", IEEE Transactions on Pattern Analysis and Machine Intelligence (PAMI), vol. 20, No. 10, pp. 1025-1039, 1998.
David A. Ross et al., "Incremental Learning for Robust Visual Tracking", IJCV, 77(1):125-141, 2008.
X. Mei and H. Ling, "Robust Visual Tracking using L1 Minimization", IEEE 12th International Conference on Computer Vision (ICCV), 2009.
T. Zhang et al., "Robust Visual Tracking via Multi-task Sparse Learning", IEEE Conference on Computer Vision and Pattern Recognition (CVPR), 2012.
Wei Zhong et al., "Robust Object Tracking via Sparse Collaborative Appearance Model", IEEE Transactions on Image Processing, vol. 23, No. 5, pp. 2356-2368, 2014.
Dorin Comaniciu et al., "Kernel- Based Object Tracking", IEEE Transactions on Pattern Analysis and Machine Intelligence (PAMI), vol. 25, No. 5, pp. 564-577, 2003.
R. T. Collins, "Mean-shift Blob Tracking through Scale Space", Conference on Computer Vision and Pattern Recognition (CVPR), 2003.
P. Perez et al., "Color-Based Probabilistic Tracking", European Conference on Computer Vision, 2002, pp. 661-675.
Navneet Dalai, "Histograms of Oriented Gradients for Human Detection", Conference on Computer Vision and Pattern Recognition, 2005, pp. 1-8.
Feng Tang et al, "Co--Tracking Using Semi Supervised Support Vector Machines", Conference on Computer Vision and Pattern Recognition, 2007.
Timo Ojala, Matti Pietikainen and Topi Mäenpää, "Multiresolution Gray Scale and Rotation Invariant Texture Classification with Local Binary Patterns", IEEE Transactions on Pattern Analysis and Machine Intelligence (PAMI), vol. 24, No. 7, pp. 971-987, 2002.
P. Viola et al., "Robust Real—Time Face Detection" International Journal of Computer Vision, vol. 57, No. 2, pp. 137-154, 2004.
H. Grabner et al, "Real-Time Tracking via On-line Boosting", British Machine Vision Conference (BMVC), 2006, pp. 1-10.
K. Zhang et al., "Real-time Compressive Tracking", European Conference on Computer Vision, 2012, pp. 866-879.
S. Avidan, "Support Vector Tracking", IEEE Transactions on Pattern Analysis and Machine Intelligence (PAMI), vol. 26, No. 8, pp. 1064-1072, 2004.
S. Avidan, "Ensemble Tracking", IEEE Transactions on Pattern Analysis and Machine Intelligence (PAMI), vol. 29, No. 2, pp. 261-271, 2008.
Alan J. Lipton et al., "Moving Target Classification and Tracking from Real-time Video", The Robotics Institute, aarnegie Mellon University, 1998, pp. 8-14.
Comaniciu et al., "Real-Time Tracking of Non-Rigid Objects using Mean Shift", IEEE Proceedings, Conference on Computer Vision and Pattern Recognition, 2000, vol. 2, pp. 142-149.
David G. Lowe, "Distinctive Image Features from Scale-Invariant Key-points", International Journal of Computer Vision Jan. 5, 2004.
International Search Report issued in International Application No. PCT/CA2017/050303, dated Jun. 15, 2017.
Written Opinion of the International Searching Authority issued in PCT/CA2017/050303, dated Jun. 15, 2017.

* cited by examiner

METHOD AND SYSTEM FOR TRACKING OBJECTS

CROSS-REFERENCE TO RELATED APPLICATIONS

This application is a National Stage of PCT/CA2017/050303, filed Mar. 6, 2017, which claims the priority of U.S. provisional application No. 62/311,749 filed Mar. 22, 2016, which are incorporated herein by reference into this application in their entirety.

TECHNICAL FIELD

The present disclosure is related to the field of object tracking, in particular, the ability to track a number of objects in a video.

BACKGROUND

Visual object tracking is not a new problem and has been worked on by thousands of researchers for several decades. In general, every object tracking algorithm consists of three major steps: object representation, search, and model update. Different schema and mechanisms for each of these steps have led to different classes of tracking algorithms.

Lucas and Kanade (LK) presented their tracking algorithm which used raw pixel intensity values to represent the target. This method does not perform well in situations where the visual properties of the target changes remarkably. Others proposed methods for more effective template update and learning the appearance of the target to better tackle the target's appearance change over time and reduce the drift problem. Several tracking methods based on sparse representations have been proposed. Another class of tracking algorithms are based on color histograms. Some tracking methods used local directional edge information such as histogram of oriented gradients (HOGs). Others used local binary patterns (LBPs) and Haar-like features to model the visual properties of the target.

There are object tracking algorithms in which a binary classifier is learned through the process of the tracking to differentiate between the target and the background. This kind of learning is also known as online learning. There are other classes of object trackers that are not introduced here. Despite the tremendous research and study in the field of visual object tracking, still there is no single solution that suits all the problems.

In Wu, et al, ("Object Tracking Benchmark", IEEE Transactions on Pattern Analysis and Machine Intelligence (PAMI), vol. 37, no. 9, pp 1834-1848, 2015.), which is incorporated by reference into this application in its entirety, an extensive comparative study on the most recent well-known visual object tracking algorithms is done by testing them against a large collection of benchmark videos. According to their reports, the STRUCK, TLD, and CSK are among the best tested algorithms by relatively having either high tracking precision or low processing time. Other algorithms such as MIL and ASLA also demonstrated very good tracking results.

Although there are many visual object tracking algorithms that produce very good results, performing object tracking on mobile devices is still challenging. The algorithms described above require high computational demand which makes them impractical on mobile devices with limited computational power.

It is, therefore, desirable to provide a simple yet effective object tracking algorithm.

SUMMARY

Videos are often captured using cameras included in mobile devices. In some embodiments, a method and system can be provided for tracking one or more objects in a video which is computationally light so that it can run on a variety of computing devices, including mobile devices which typically have a limited computational power compared to desktop computers. The tracked objects can be selected, and can then be automatically tracked afterwards. The tracked objects can be deselected or have their bounding boxes moved or resized at any time. The tracking can be performed using online learning with a binary classifier to separate the target from the background. In some embodiments, the methods and systems can be used to identify and track one or more persons or objects to protect their privacy in recorded videos. This can be done by tracking the person or object and blurring or blacking out the corresponding region in the processed video.

In some embodiments, the methods and systems described herein can provide for the tracking of one or more objects that is able to perform at an acceptable precision rate and at a frame processing rate on systems with limited computational power.

Broadly stated, in some embodiments, a method can be provided for tracking an object in video, the method comprising the steps of: receiving a reference image from a video containing a plurality of frames; selecting one or more objects in the reference image frame; generating an object feature vector for each of the one or more objects; generating a plurality of classification samples for each of the one or more objects feature vectors; receiving a next frame; generating a plurality of search samples for each of the one or more objects; updating the one or more objects location in the next frame by selecting the search sample with the lowest distance to the one or more objects feature vector, and updating the objects feature vector.

Broadly stated, in some embodiments, the steps of receiving a next frame; generating a plurality of search samples for each of the one or more objects; updating the one or more objects location in the next frame by selecting the search sample with the lowest distance to the one or more objects feature vector, and updating the objects feature vector can be repeated for each subsequent frame of the video.

Broadly stated, in some embodiments, the step of generating the plurality of classification samples can further comprise the steps of: sampling the reference image around the one or more objects; generating a sample feature vector for each sample; and classifying each sample feature vector as representing either an object class or a background class.

Broadly stated, in some embodiments, the step of generating a plurality of search samples can further comprise the steps of: sampling the next frame around the one or more objects location in a previous frame; generating a search feature vector for each sample; classifying each search samples as representing either the object class or the background class; and calculating a vector distance between each of the search samples classified in the object class and the one or more objects feature vector.

Broadly stated, in some embodiments, the step of selecting the one or more objects in the reference image frame can further comprise detecting faces in the reference image.

Broadly stated, in some embodiments, the method can further comprise the step of converting the reference image and the next image to grayscale.

Broadly stated, in some embodiments, the method can further comprise the step of downscaling the reference image and the next image.

Broadly stated, in some embodiments, the steps of generating the object feature vector, the sample feature vectors and the search feature vectors can further comprise the steps of: dividing the one or more object into a plurality of cells containing a plurality of pixels each having an intensity value; generating a histogram for each of the plurality of cells containing a plurality of bins for the intensity values of each of the plurality of pixels; and grouping the histograms for each of the plurality of cells to generate the object feature vector, the sample feature vectors or the search feature vector.

Broadly stated, in some embodiments, the step of classifying the search feature vector can further comprise the steps of: calculating the vector distance between the search feature vector and each of the plurality of sample feature vectors; determining the a plurality of nearest neighbor feature vectors to the search feature vector; and classifying the search feature vector as belong to either the object class or the background class as determined by the class with the greatest representation among the nearest neighbor feature vectors.

Broadly stated, in some embodiments, the plurality of nearest neighbors feature vectors can be limited to 3.

Broadly stated, in some embodiments, the step of calculating the vector distance can be accomplished using the L2-norm of the vector difference.

Broadly stated, in some embodiments, the method can further comprise the step of applying the location of each of the one or more objects to the reference frame and the next frame and obscuring the image at the location of any of the one or more objects.

Broadly stated, in some embodiments, the step of obscuring the image can be performed by blurring the object.

Broadly stated, in some embodiments, the step of obscuring can be performed by blacking out the object.

Broadly stated, in some embodiments, a system can be provided for tracking an object in a video, the system can comprise computer-readable memory medium containing instructions for controlling a computer processor performing a method which can comprise the steps of: receiving a reference image from a video containing a plurality of frames; selecting one or more objects in the reference image frame; generating an object feature vector for each of the one or more objects; generating a plurality of classification samples for each of the one or more objects feature vectors; receiving a next frame; generating a plurality of search samples for each of the one or more objects; updating the one or more objects location in the next frame by selecting the search sample with the lowest distance to the one or more objects feature vector, and updating the objects feature vector.

Broadly stated, in some embodiments, the system can receive a next frame; generate a plurality of search samples for each of the one or more objects; update the one or more objects location in the next frame by selecting the search sample with the lowest distance to the one or more objects feature vector, and update the objects feature vector are repeated for each subsequent frame of the video.

Broadly stated, in some embodiments, the system can further comprise the step of applying the location of each of the one or more objects to the reference frame and the next frame and obscuring the image at the location of any of the one or more objects.

Broadly stated, in some embodiments, a system can be provided for tracking an object in a video, the system comprising: means for receiving a reference image from a video containing a plurality of frames; means for selecting one or more objects in the reference image frame; means for generating an object feature vector for each of the one or more objects; means for generating a plurality of classification samples for each of the one or more objects feature vectors; means for receiving a next frame; means for generating a plurality of search samples for each of the one or more objects; means for updating the one or more objects location in the next frame by selecting the search sample with the lowest distance to the one or more objects feature vector, and means for updating the objects feature vector.

Broadly stated, in some embodiments, the system can further comprise a means for processing subsequent frames of the video using the means for receiving a next frame; means for generating a plurality of search samples for each of the one or more objects; means for updating the one or more objects location in the next frame by selecting the search sample with the lowest distance to the one or more objects feature vector, and means for updating the objects feature vector.

Broadly stated, in some embodiments, the means generating the plurality of classification samples can further comprise: means for sampling the reference image around the one or more objects; means for generating a sample feature vector for each sample; and means for classifying each sample feature vector as representing either an object class or a background class.

Broadly stated, in some embodiments, the means for generating a plurality of search samples can further comprise: means for sampling the next frame around the one or more objects location in a previous frame; means for generating a search feature vector for each sample; means for classifying each search samples as representing either the object class or the background class; and means for calculating a vector distance between each of the search samples classified in the object class and the one or more objects feature vector.

Broadly stated, in some embodiments, the means for selecting the one or more objects in the reference image frame can further comprise a means for detecting faces in the reference image.

Broadly stated, in some embodiments, the system can further comprise a means for converting the reference image and the next image to grayscale.

Broadly stated, in some embodiments, the system can further comprise a means for downscaling the reference image and the next image.

Broadly stated, in some embodiments, the means for generating the object feature vector, the sample feature vectors and the search feature vectors can further comprise: means for dividing the one or more object into a plurality of cells containing a plurality of pixels each having an intensity value; means for generating a histogram for each of the plurality of cells containing a plurality of bins for the intensity values of each of the plurality of pixels; and means for grouping the histograms for each of the plurality of cells to generate the object feature vector, the sample feature vectors or the search feature vector.

Broadly stated, in some embodiments, the means for classifying the search feature vector can further comprise: means for calculating the vector distance between the search feature vector and each of the plurality of sample feature vectors; means for determining the a plurality of nearest neighbor feature vectors to the search feature vector; and means for classifying the search feature vector as belong to either the object class or the background class as determined by the class with the greatest representation among the nearest neighbor feature vectors.

Broadly stated, in some embodiments, the plurality of nearest neighbors feature vectors can be limited to 3.

Broadly stated, in some embodiments, the means for calculating the vector distance can be accomplished using the L2-norm of the vector difference.

Broadly stated, in some embodiments, the system can further comprise a means for applying the location of each of the one or more objects to the reference frame and the next frame and obscuring the image at the location of any of the one or more objects.

Broadly stated, in some embodiments, the means for obscuring the image can be performed by blurring the object.

Broadly stated, in some embodiments, the means for obscuring can be performed by blacking out the object.

Broadly stated, in some embodiments, the system can apply the location of each of the one or more objects to the reference frame and the next frames and obscuring the location of any of the one or more objects and store the video to the computer readable memory medium.

DETAILED DESCRIPTION OF EMBODIMENTS

A method and system for object tracking is provided. In some embodiments this method can be performed on any computing device including a mobile device with limited computing power. This device can include, but is not limited to, a video display device, user input device, such as a touchscreen, mouse, or keyboard, processor and a memory storage device.

In some embodiments, videos in many different formats can be read by the system and processed according to the methods and systems described herein.

Figure 1:
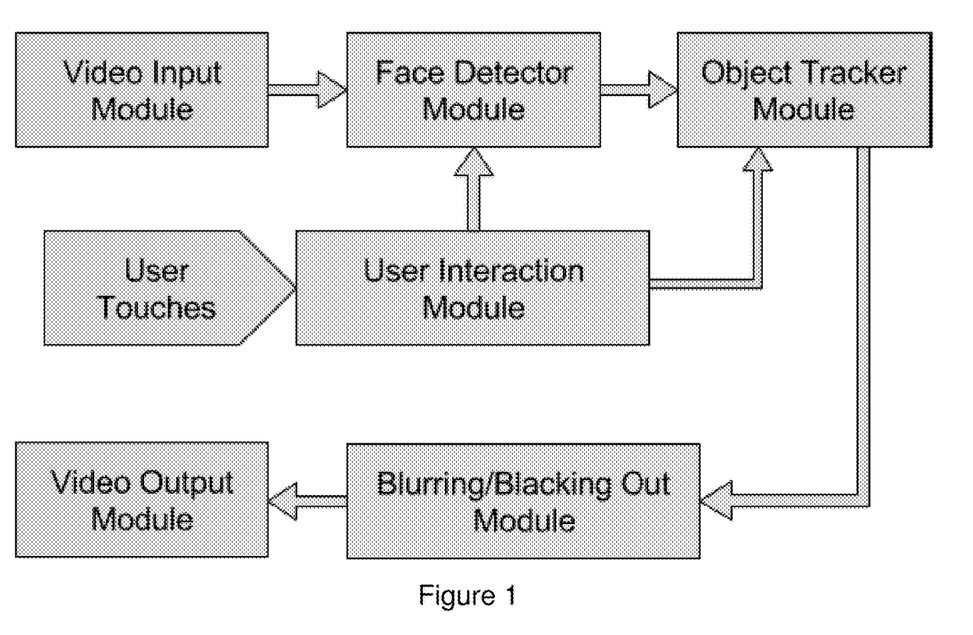
FIG. 1 is a Block Diagram depicting an embodiment of the architecture for a method and system of object tracking

FIG. 1 shows a block diagram of the architecture of one embodiment of the method. Video processing tool 100 can comprise a video input module 110, user interaction module 120, face/object detection module 130, object tracker module 140, object obscuring module 150 and video output module 160.

Figure 2:
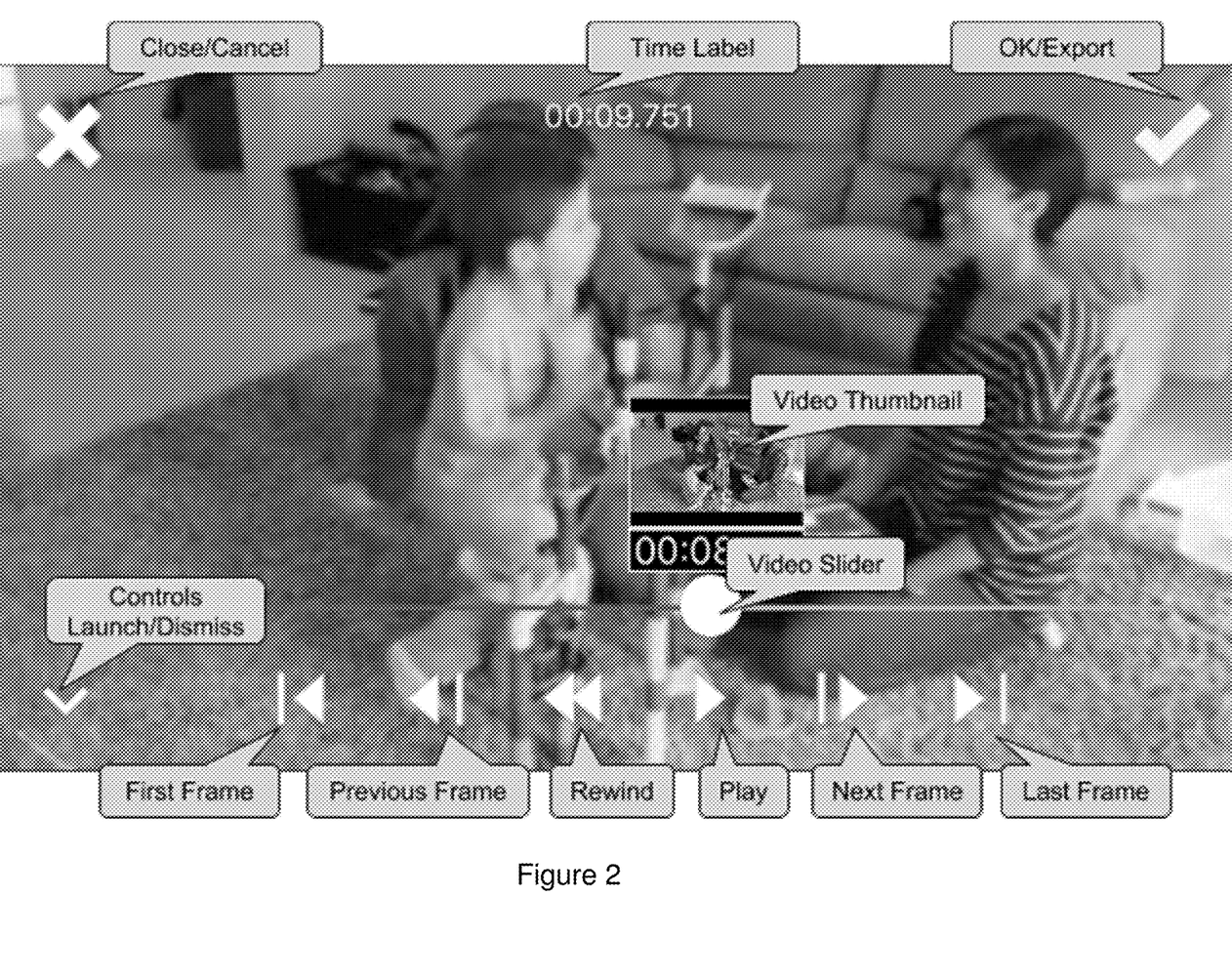
FIG. 2 is a screenshot of the User Interface of an embodiment for the method and system of FIG. 1.
Figure 3:
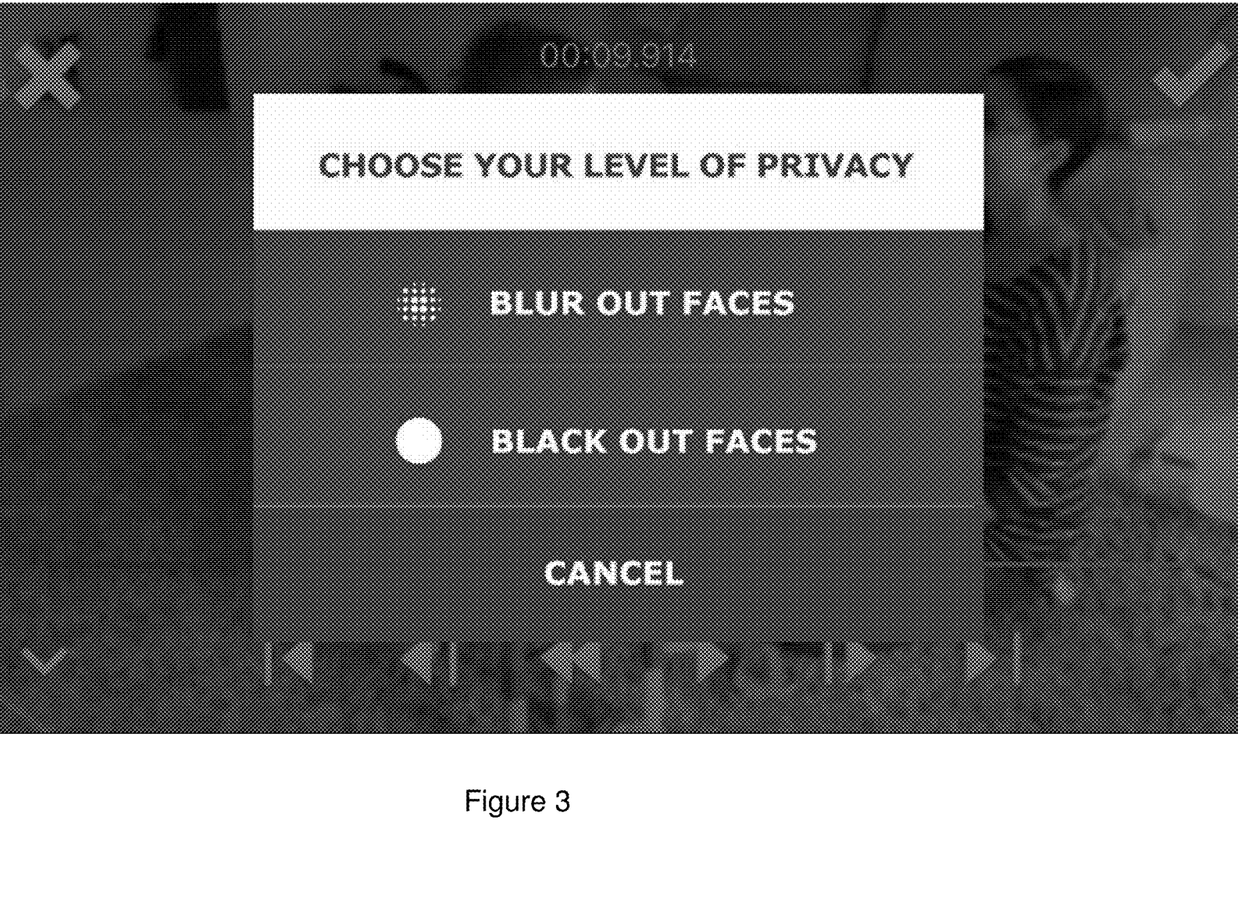
FIG. 3 is a screenshot of the privacy selection screen depicting an embodiment for the method and system of FIG. 1

FIGS. 2 and 3 depict screenshots of the graphical user interface (GUI) and privacy selection screen according to an embodiment which can allow the user to interact with the system. In some embodiments the user can select an object of interest. In some embodiments, the program can then automatically detect an object in the selected region.

Figure 4:
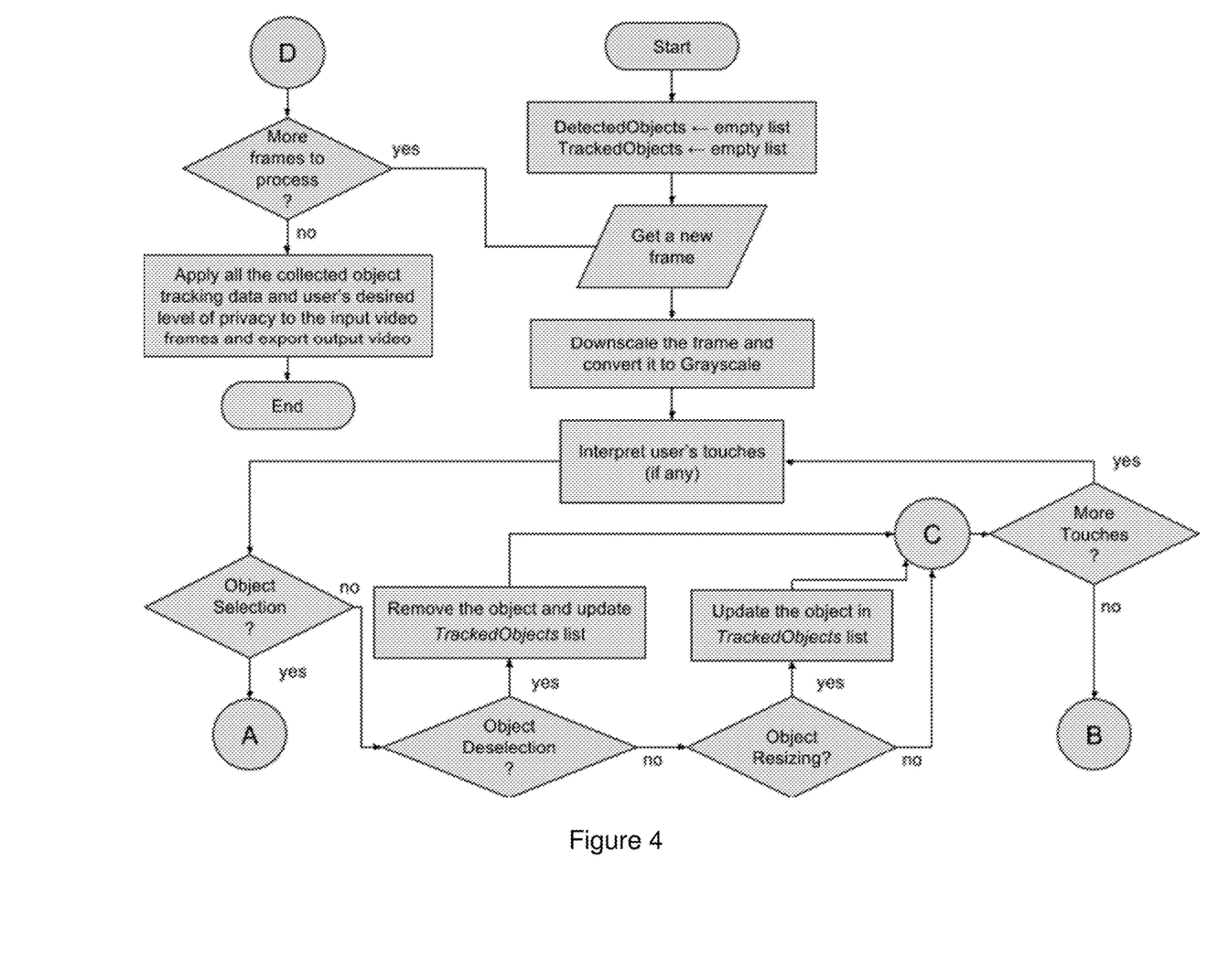
FIG. 4 is a flowchart depicting a first portion of a procedure flow model for a method and system of FIG. 1.
Figure 5:
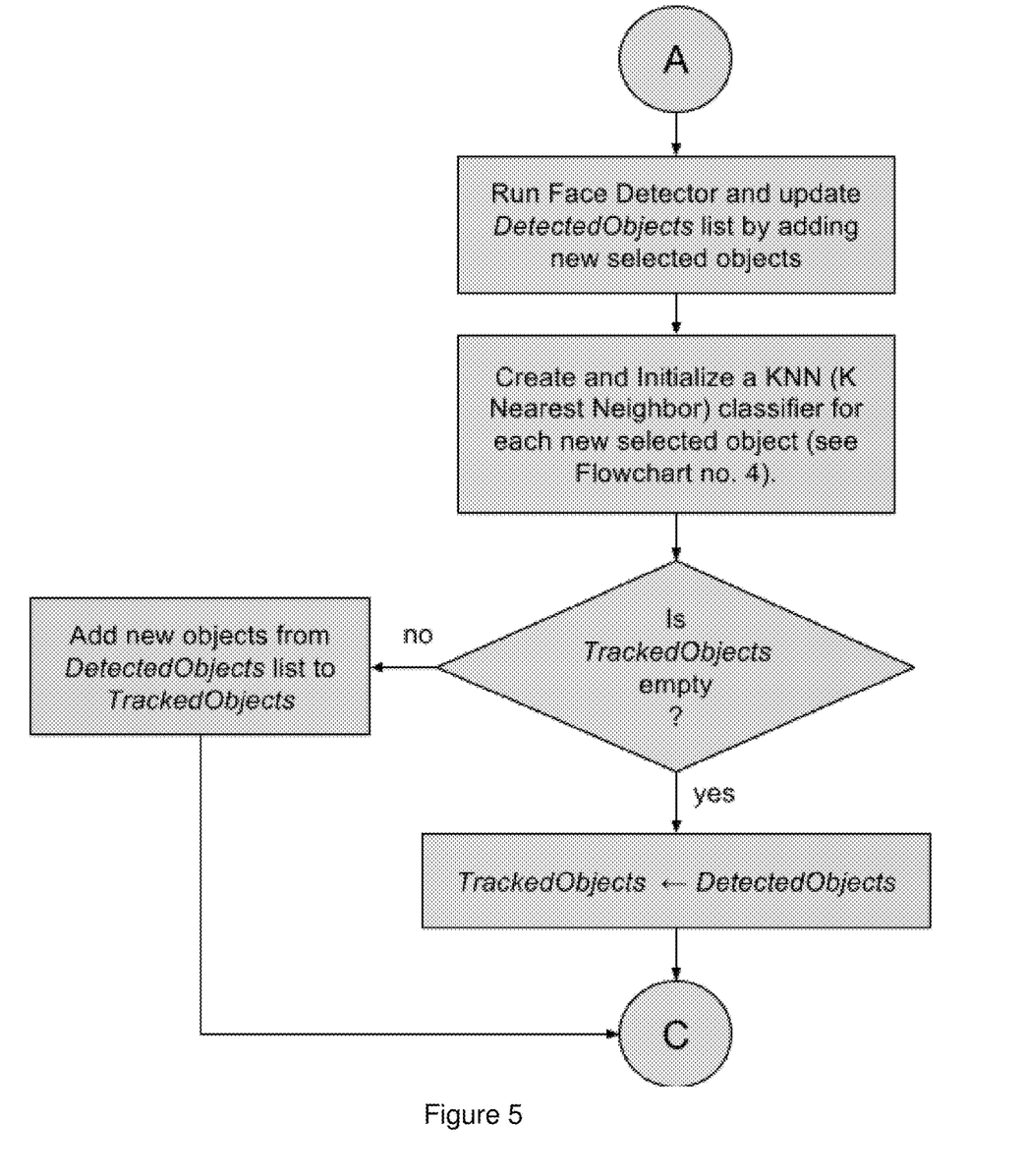
FIG. 5 is a flowchart depicting a second portion of a procedure flow model for a method and system of FIG. 1.
Figure 6:
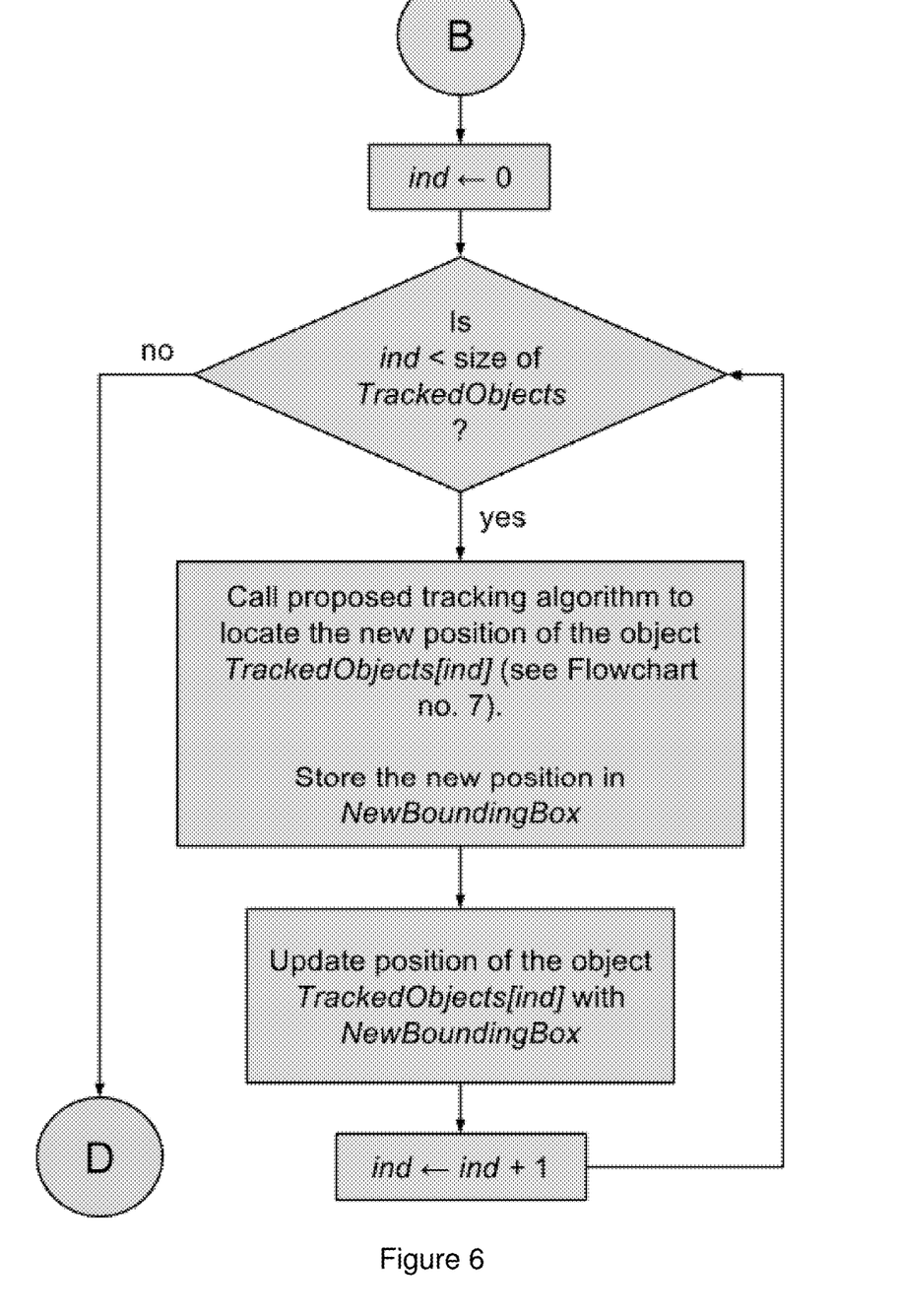
FIG. 6 is a flowchart depicting a third portion of a procedure flow model for a method and system of FIG. 1.

FIGS. 4 to 6 illustrate the procedural flow of an embodiment of the system and method for object tracking 400. Referring to FIG. 4, step 404 can initialize the procedure such that no objects are initially selected or tracked. Next, at step 408 a new frame of the video can be retrieved. At step 412 the frame can be converted to grayscale and can be downscaled to reduce the memory size. The grayscale image can be used for object tracking but is not typically displayed to the user. At step 416 the procedure can then check if there has been any user input. In some embodiments, the input can be performed through a touchscreen. However, this input can be performed with a keyboard, mouse or other user input device known in the art. The procedure can then determine the function to be performed in response to the input. Step 420 can identify if an object is selected. If so, the flowchart can continue on FIG. 5, with new object selection procedure 500. Step 424 can identify if an object is deselected. If so, step 428 can remove the object from the TrackedObjects list. Step 432 can identify if an object's bounding box has been resized. If so, step 436 can update the new properties of the modified object in the TrackedObject List. Step 440 can determine if there are any more user inputs to be processed. If there are more user inputs the procedure can return to step 416 to process the input. If all of the user inputs have been processed, the procedure can continue on FIG. 6 by looping through the TrackedObjects and calling the tracking function for each TrackedObject.

Figure 7:
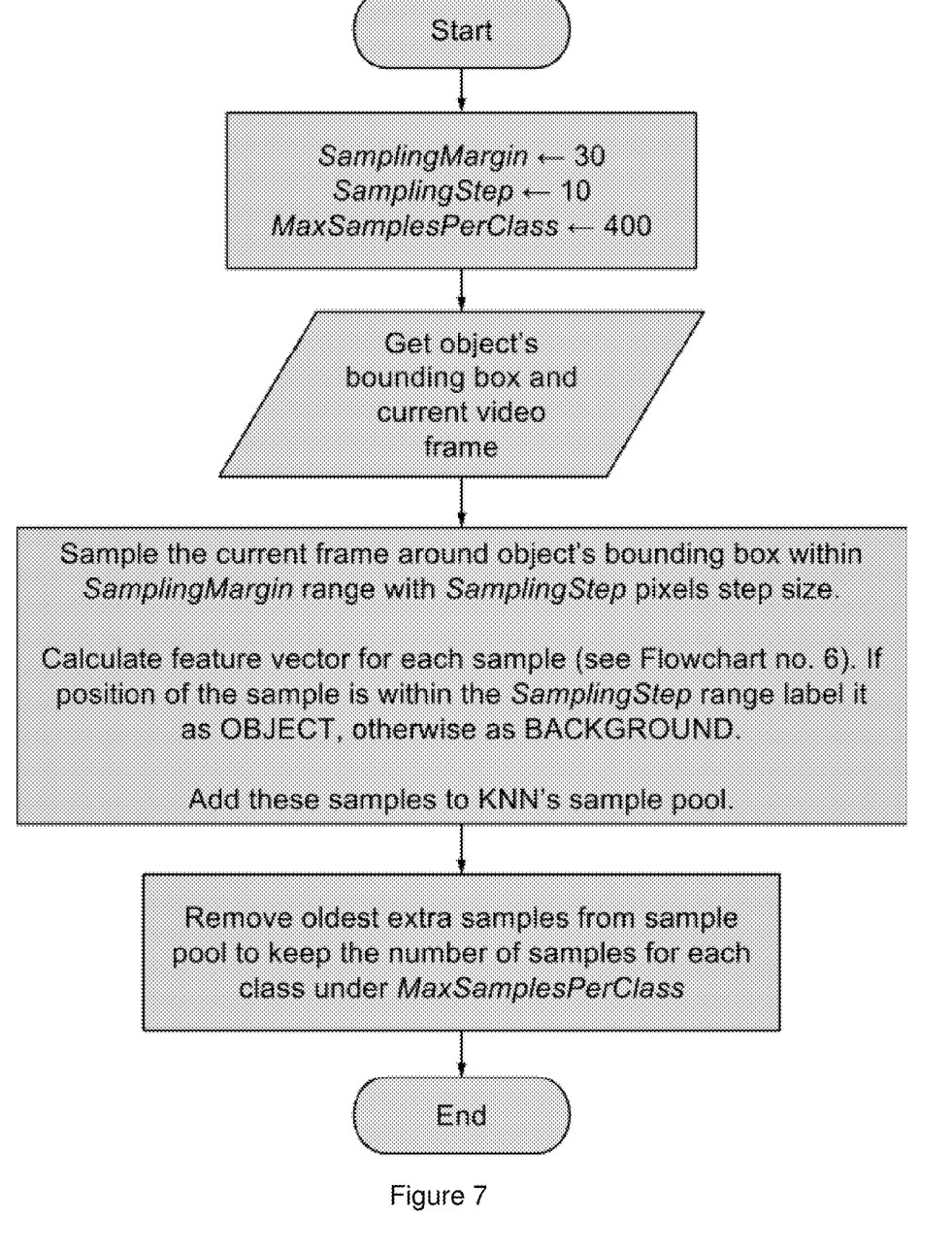
FIG. 7 is a flowchart depicting a procedure flow model of an initialization function for the method and system of FIG. 1.

Referring to FIG. 5, when a new object is selected, in some embodiments, step 504 can use a face detection function to detect a faces near the selected area. This can be done using any method of face detection known in the art, such as Apple™'s CIDetector or OpenCV's VoilaJones object detection algorithm. If no face is detected or if no face detection function is used, an object of default size can be set as the DetectedObject. Step 508 can create and can then initialize a classification sample pool for the DetectedObject. This can be done using the KNN initialization function described in detail below as shown in FIG. 7. Step 512 can check if the TrackedObjects list is empty. If so, step 516 can initialize the TrackedObjects list with the DetectedObjects list. Otherwise, step 520 can add the new DetectedObjects to the existing TrackedObject list 520. The procedure then returns to FIG. 4 and continues processing user inputs at step 438.

Figure 9:
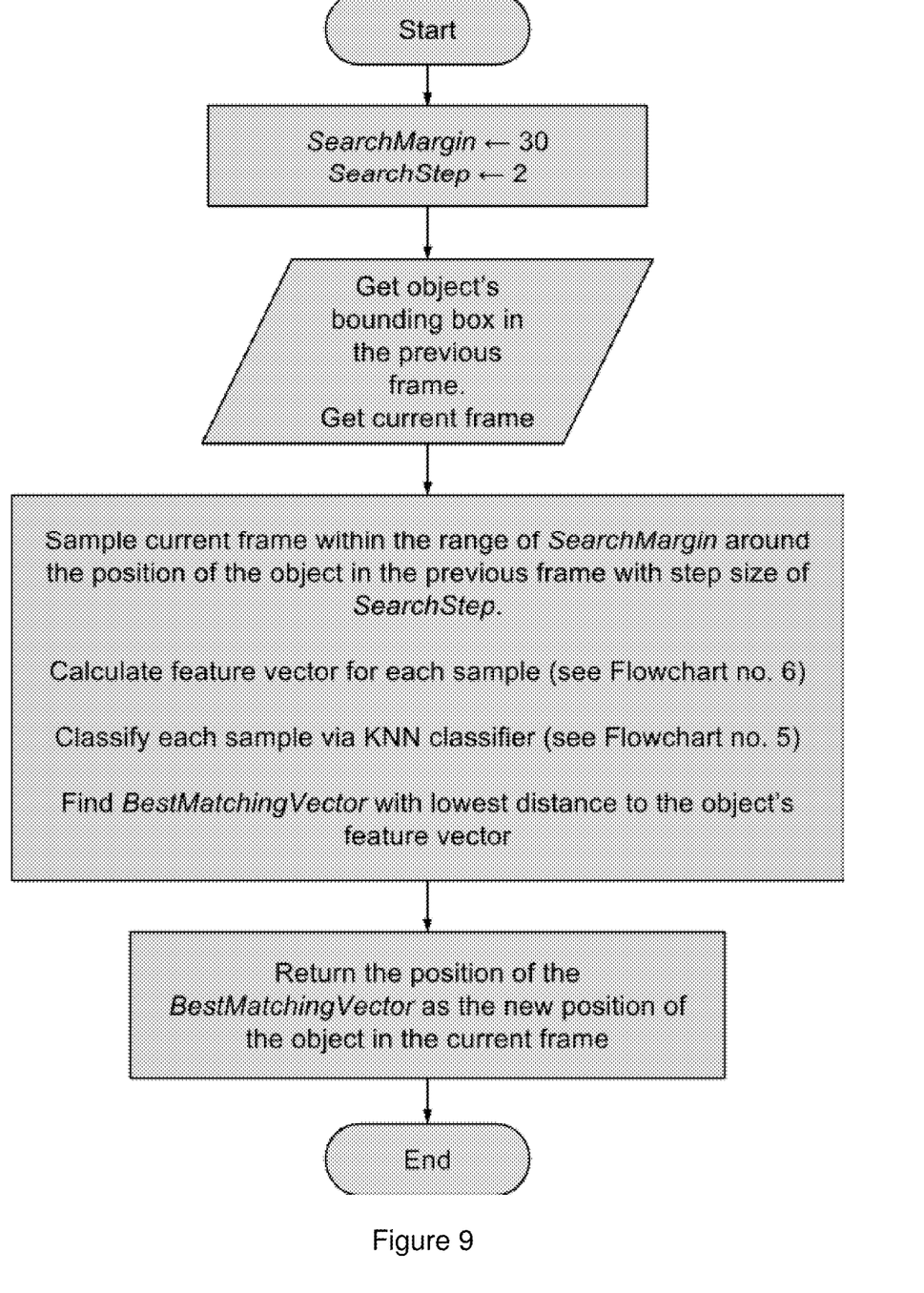
FIG. 9 is a flowchart depicting a procedure flow model of a feature vector calculation function for the method and system of FIG. 1.

Once the user inputs have been processed, FIG. 6 depicts steps that can track the objects. At step 604 a loop can be initialized 604. Step 608 can control the flow through the loop such that the following steps are taken for each object in the TrackedObjects list. Step 612 can call the Object Tracking Function, which is described in detail below as shown in FIG. 9, which can be used to update the location of the object in the current frame of the video. Step 616 can store the updated position in the TrackedObjects list.

Once the position of all of the objects in the TrackedObjects list have been updated in the current frame, step 444 can then check if there are any more frames to process. If so, the procedure can return to step 408 to get the next frame to process. When there are no more frames to process, in some embodiments, step 448 can apply all of the collected object tracking data and apply the desired level of privacy. As shown in FIG. 3, this can include obscuring the object by means such as blurring or blacking out the object.

The Functions that can be used within the procedure are described.

KNN Initialization Function

Referring to FIG. 7, when a new object is selected, a KNN initialization function 700 can initialize a KNN classification sample pool for the object that can be used for object tracking by tracking function 900. KNN initialization function 700 is initialized at step 704 by setting: the SamplingMargin, which can set the sampling range surrounding the objects bounding box, the SamplingStep, which can set the step size in pixels between each sample, and the MaxSamplesPerClass, which can be used to limit the size of the sample pool to limit the memory and processing requirements when the KNN search is performed. At Step 708, the objects current bounding box and the grayscale image of the current frame can be received as inputs to the function. At Step 712, the current video frame can be sampled around the object's bounding box by shifting the bounding box by SamplingStep pixels within SamplingMargin range of the bounding box. In some embodiments the SamplingMargin can be set to 30 pixels, the SamplingStep can be set to 10 pixels and the MaxSamplesPerClass can be set to 400 samples. However, these settings may be adjusted depending on the number of samples desired as can be determined by one skilled in the art.

Figure 8:
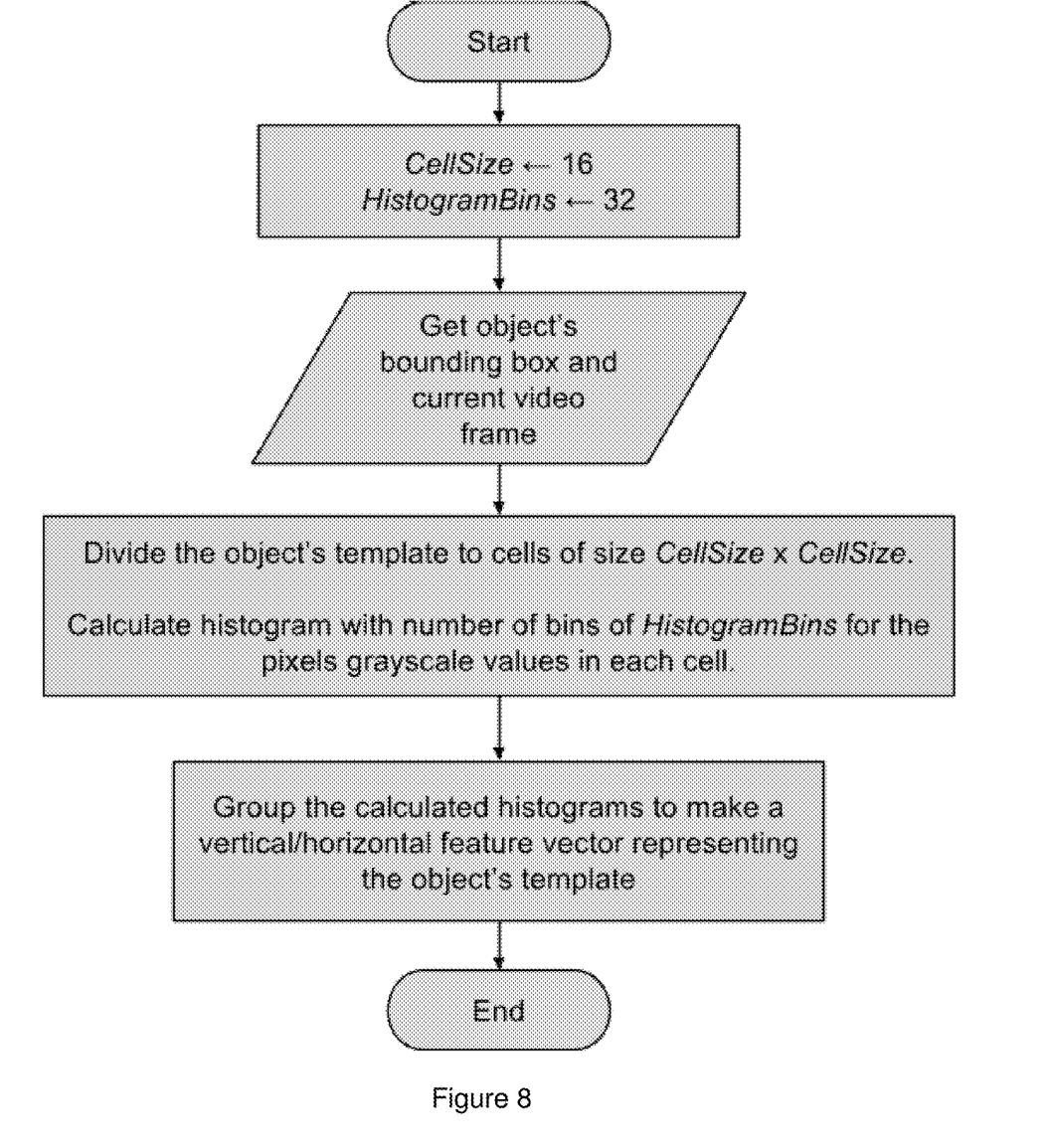
FIG. 8 is a flowchart depicting a procedure flow model of a classification function for the method and system of FIG. 1.

Continuing step 712, a feature vector can be calculated using the Feature Vector Calculation Function, described in detail below as shown in FIG. 8, for each sampling location. The initial set of samples can classified as 'OBJECT' if they are within SamplingStep of the bounding box and can be classified as 'BACKGROUND' if further way from the bounding box. This function can also be used to update the KNN sample pool. At step 716, the oldest samples can be removed from the sample pool if the total number of samples exceeds MaxSamplesPerClass.

Feature Vector Calculation Function

FIG. 8, illustrates feature vector calculation function 800. At step 804, the function can be initialized by setting: the CellSize, which defines the size of the cells the object template will be divided into, and HistogramBins, which sets the number of bins into which the intensity values for the pixels in the cells will be grouped. At Step 808, the objects current bounding box and the grayscale image of the current frame can be received as inputs to the function. Step 812 can divide the bounding box into cells of size CellSize x CellSize and can calculate a histogram with HistogramBins number of bins for the pixels grayscale intensity values in each cell. Then at step 816 the histograms for each cell can be combined to form a one dimensional vertical/horizontal feature vector representing the object's template. This feature vector can then be returned by the function.

Object Tracking Function

Figure 10:
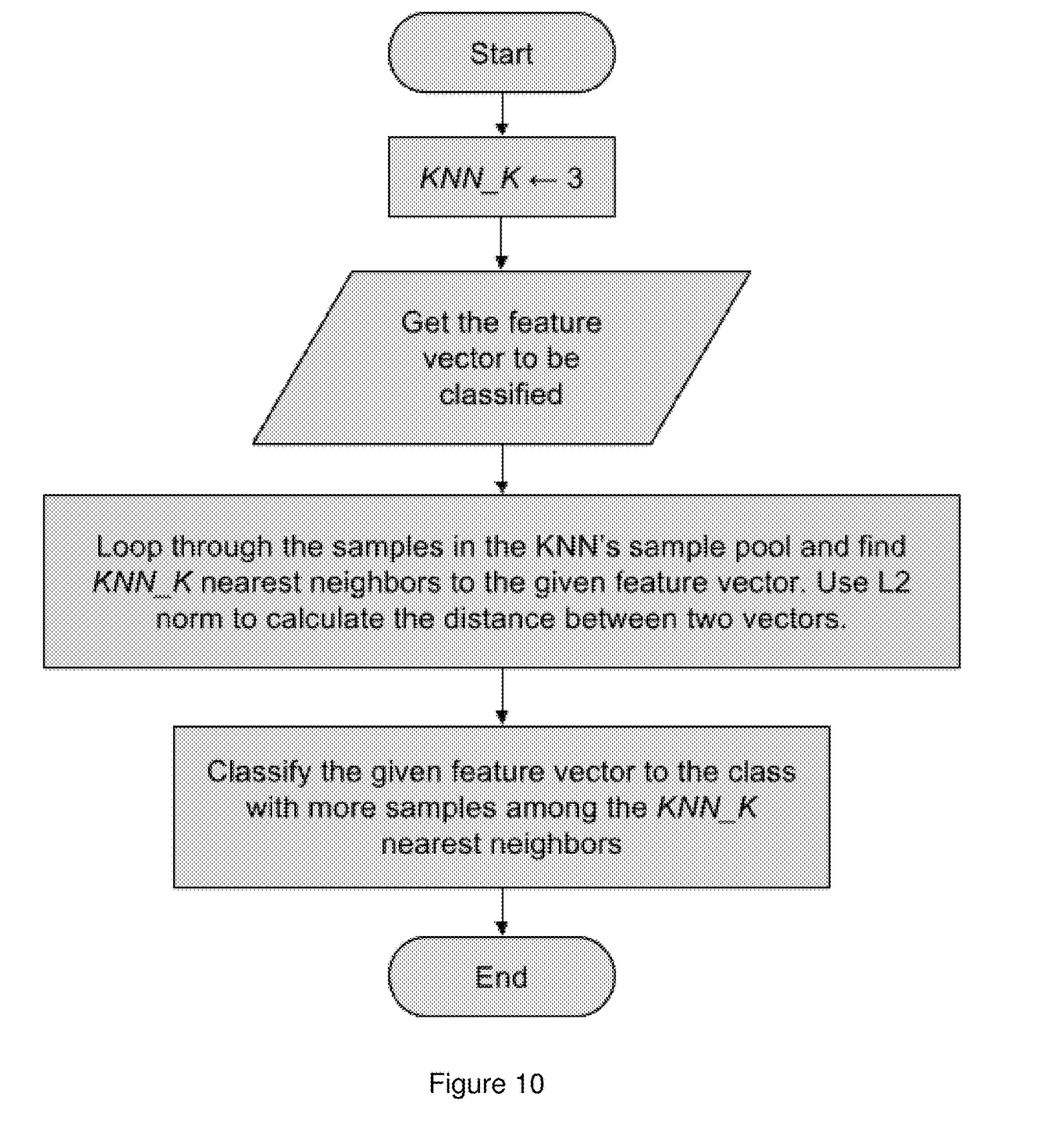
FIG. 10 is a flowchart depicting a procedure flow model of a tracking function for the method and system of FIG. 1.

FIG. 9 illustrates the Object Tracking Function 900. First, step 904 can initialize the function by setting: the SearchMargin, which can set the search range surrounding the previous location of the objects bounding box, and the SearchStep, which can set the step size in pixels between each search sample. At Step 908, the objects current bounding box and the grayscale image of the current frame can be received as inputs to the function. The current frame can be the frame in which the object is to be located. The bounding box from the previous frame can represent the previous location of the object. At Step 912, the current frame can be searched by sampling the current frame with the range of SearchMargin around the position of the object in the previous frame with a step size of SearchStep. In some embodiments, SearchMargin can be set to 30 pixels and SearchStep can be set to 2. These values can be varied depending on the number of samples to be used for the search and the processing power of the computing system being used as can be determined by one skilled in the art. Continuing step 912, a feature vector can be calculated for each sample using the Feature Vector Calculation Function described previously. Each of the samples can then be classified as either OBJECT or BACKGROUND using the KNN Classifier Function described in detail below as shown in FIG. 10. The BestMatchingVector is determined by finding the OBJECT classified feature vector with the lowest distance to the object's current feature vector. The distance can be calculated using the L2-norm of the vector difference (also known as Euclidean Distance) or Sum of Squared Difference (SSD). Step 916 can return the position of the BestMatchingVector as the new position of the object in the current frame.

KNN Classifier Function

Referring to FIG. 10, KNN Classifier Function 1000, at step 1004, can initialize KNN_K, being the 'k' value which can be used for the KNN search. In some embodiments, KNN_K can be set to 3. The feature vector to be classified can be passed as an input to the KNN Classifier Function at step 1008. At step 1012, the function can then loop through all of the samples in the KNN sample pool to find the KNN_K nearest neighbors to the provided feature vector. The l2-norm can be used to calculate the distance between the two vectors (also known as Euclidean Distance) or Sum of Squared Difference (SSD). At step 1016, the input feature vector can be classified according to the class with more samples among the KNN_K nearest neighbors.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

REFERENCES

The following documents represent the prior art that is relevant to the methods and systems described herein, and are further incorporated by reference into this application in their entirety:

[1] Yi Wu, Jongwoo Lim, and Ming-Hsuan Yang, "Object Tracking Benchmark", IEEE Transactions on Pattern Analysis and Machine Intelligence (PAMI), vol. 37, no. 9, pp. 1834-1848, 2015.

[2] S. Hare, A. Saffari, and P. H. S. Torr, "Struck: Structured Output Tracking with Kernels", In ICCV, 2011.

[3] Z. Kalal, J. Matas, and K. Mikolajczyk, "P-N Learning: Bootstrapping Binary Classifiers by Structural Constraints", In CVPR, 2010.

[4] J. a. F. Henriques, R. Caseiro, P. Martins, and J. Batista, "Exploiting the Circulant Structure of Tracking-by-Detection with Kernels", In ECCV, 2012.
[5] B. Babenko, M.-H. Yang, and S. Belongie, "Robust Object Tracking with Online Multiple Instance Learning", IEEE Transactions on Pattern Analysis and Machine Intelligence (PAMI), vol. 33, no. 7, pp. 1619-1632, 2011.
[6] X. Jia, H. Lu, and M.-H. Yang, "Visual Tracking via Adaptive Structural Local Sparse Appearance Model", In CVPR, 2012.
[7] B. D. Lucas and T. Kanade, "An Iterative Image Registration Technique with An Application to Stereo Vision", In IJCAI, 1981.
[8] I. Matthews, T. Ishikawa, and S. Baker, "The Template Update Problem", IEEE Transactions on Pattern Analysis and Machine Intelligence (PAMI), vol. 26, no. 6, pp. 810-815, 2004.
[9] G. D. Hager and P. N. Belhumeur, "Efficient Region Tracking With Parametric Models of Geometry and Illumination", IEEE Transactions on Pattern Analysis and Machine Intelligence (PAMI), vol. 20, no. 10, pp. 1025-1039, 1998.
[10] D. Ross, J. Lim, R.-S. Lin, and M.-H. Yang, "Incremental Learning for Robust Visual Tracking", IJCV, 77(1): 125-141, 2008.
[11] X. Mei and H. Ling, "Robust Visual Tracking using L1 Minimization", In ICCV, 2009.
[12] T. Zhang, B. Ghanem, S. Liu, and N. Ahuja, "Robust Visual Tracking via Multi-task Sparse Learning", In CVPR, 2012.
[13] W. Zhong, H. Lu, and M.-H. Yang, "Robust Object Tracking via Sparse Collaborative Appearance Model", IEEE Transactions on Image Processing, vol. 23, no. 5, pp. 2356-2368, 2014.
[14] D. Comaniciu, V. Ramesh, and P. Meer, "Kernel-Based Object Tracking", IEEE Transactions on Pattern Analysis and Machine Intelligence (PAMI), vol. 25, no. 5, pp. 5 64-577, 2003.
[15] R. T. Collins, "Mean-shift Blob Tracking through Scale Space", In CVPR, 2003.
[16] P. Perez, C. Hue, J. Vermaak, and M. Gangnet, "Color-Based Probabilistic Tracking", In ECCV,2002.
[17] N. Dalai and B. Triggs, "Histograms of Oriented Gradients for Human Detection", In C VPR, 2005.
[18] F. Tang, S. Brennan, Q. Zhao, and H. Tao, "Co-Tracking Using Semi Supervised Support Vector Machines", In CVPR, 2007.
[19] Timo Ojala, Matti Pietikäinen and Topi Mäenpää, "Multiresolution Gray Scale and Rotation Invariant Texture Classification with Local Binary Patterns", IEEE Transactions on Pattern Analysis and Machine Intelligence (PAMI), vol. 24, no. 7, pp. 971-987, 2002.
[20] P. Viola and M. J. Jones, "Robust Real-Time Face Detection" IJCV, 57(2): 137-154, 2004.
[21] H. Grabner, M. Grabner, and H. Bischof, "Real-Time Tracking via Online Boosting", In BMVC, 2006.
[22]. Zhang, L. Zhang, and M.-H. Yang, "Real-time Compressive Tracking", In ECCV, 2012.
[23] S. Avidan, "Support Vector Tracking", IEEE Transactions on Pattern Analysis and Machine Intelligence (PAMI), vol. 26, no. 8, pp. 1064-1072, 2004.
[24] S. Avidan, "Ensemble Tracking", IEEE Transactions on Pattern Analysis and Machine Intelligence (PAMI), vol. 29, no. 2, pp. 261-271, 2008.

I claim:

1. A method for tracking one or more objects in a video, the method comprising the steps of:
   a) receiving a reference image from the video containing a plurality of frames;
   b) selecting a position of the one or more objects in the reference image frame;
   c) generating an object feature vector for each of the one or more objects;
   d) generating a plurality of classification samples for each of the one or more objects feature vectors;
   e) receiving a next frame;
   f) generating a plurality of search samples for each of the one or more objects;
   g) updating the position of each of the one or more objects in the next frame by selecting the search sample with the lowest distance to the respective one or more objects feature vector as the position of each of the one or more objects.

2. The method as set forth in claim 1 further comprising the step of updating each of the one or more objects feature vectors based on the updated position of each of the one or more objects, and repeating the steps e) to g) of claim 1 for each subsequent frame of the video.

3. The method as set forth in claim 1 wherein the step of generating the plurality of classification samples further comprises the steps of:
   a) sampling the reference image around the one or more objects;
   b) generating a sample feature vector for each sample; and
   c) classifying each sample feature vector as representing either an object class or a background class.

4. The method as set forth in claim 1 wherein the step of generating a plurality of search samples further comprises the steps of:
   a) sampling the next frame around the position of the one or more objects in a previous frame;
   b) generating a search feature vector for each sample;
   c) classifying each search feature vector as representing either the object class or the background class; and
   d) calculating a vector distance between each of the search feature vector classified in the object class and the one or more objects feature vector.

5. The method as set forth in claim 4 wherein the step of classifying the search feature vector further comprises the steps of:
   a) calculating the vector distance between the search feature vector and each of the plurality of sample feature vectors;
   b) determining a plurality of nearest neighbor feature vectors to the search feature vector; and
   c) classifying the search feature vector as belong to either the object class or the background class as determined by the class with the greatest representation among the nearest neighbor feature vectors.

6. The method as set forth in claim 5 wherein the plurality of nearest neighbors feature vectors is limited to 3.

7. The method as set forth in claim 4 wherein step of calculating the vector distance is accomplished using the L2-norm of the vector difference.

8. The method as set forth in claim 1 wherein the step of selecting the position of the one or more objects in the reference image frame further comprises detecting faces in the reference image.

9. The method as set forth in claim 1 further comprising the step of converting the reference image and the next image to grayscale.

10. The method as set forth in claim 1 further comprising the step of downscaling the reference image and the next image.

11. The method as set forth in claim 1 wherein the step of generating the object feature vector, the sample feature vectors and the search feature vectors further comprises the steps of:
   a) dividing the one or more object into a plurality of cells containing a plurality of pixels each having an intensity value;
   b) generating a histogram for each of the plurality of cells containing a plurality of bins for the intensity values of each of the plurality of pixels; and
   c) grouping the histograms for each of the plurality of cells to generate the object feature vector, the sample feature vectors or the search feature vector.

12. The method as set forth in claim 1 further comprising the step of applying the position of each of the one or more objects to the reference frame and the next frame and obscuring the image at the position of any of the one or more objects.

13. The method as set forth in claim 12 wherein the step of obscuring the image is performed by blurring the object.

14. The method as set forth in claim 12 wherein obscuring is performed by blacking out the object.

15. A system for tracking one or more object in a video, the system comprising computer-readable memory medium containing instructions for controlling a computer processor performing a method comprising:
   a) receiving a reference image from the video containing a plurality of frames;
   b) selecting a position of the one or more objects in the reference image frame;
   c) generating an object feature vector for each of the one or more objects;
   d) generating a plurality of classification samples for each of the one or more objects feature vectors;
   e) receiving a next frame;
   f) generating a plurality of search samples for each of the one or more objects;
   g) updating the position of each of the one or more objects in the next frame by selecting the search sample with the lowest distance to the respective one or more objects feature vector as the position of each of the one or more objects.

16. The system as set forth in claim 15 further comprising the step of updating each of the one or more objects feature vectors based on the updated position of each of the one or more objects, and repeating the steps e) to g) of claim 15 for each subsequent frame of the video.

17. The system as set forth in claim 15 wherein the step of generating the plurality of classification samples further comprises the steps of:
   a) sampling the reference image around the one or more objects;
   b) generating a sample feature vector for each sample; and
   c) classifying each sample feature vector as representing either an object class or a background class.

18. The system as set forth in claim 15 wherein the step of generating a plurality of search samples further comprises the steps of:
   a) sampling the next frame around the one or more objects location in a previous frame;
   b) generating a search feature vector for each sample;
   c) classifying each search feature vector as representing either the object class or the background class; and
   d) calculating a vector distance between each of the search feature vector classified in the object class and the one or more objects feature vector.

19. The system as set forth in claim 18 wherein the step of classifying the search feature vector further comprises the steps of:
   a) calculating the vector distance between the search feature vector and each of the plurality of sample feature vectors;
   b) determining a plurality of nearest neighbor feature vectors to the search feature vector; and
   c) classifying the search feature vector as belong to either the object class or the background class as determined by the class with the greatest representation among the nearest neighbor feature vectors.

20. The system as set forth in claim 18 wherein the plurality of nearest neighbors feature vectors is limited to 3.

21. The system as set forth in claim 18 where in step of calculating the vector distance is accomplished using the L2-norm of the vector difference.

22. The system as set forth in claim 15 wherein the step of selecting the position of the one or more objects in the reference image frame further comprises detecting faces in the reference image.

23. The system as set forth in claim 15 further comprising the step of converting the reference image and the next image to grayscale.

24. The system as set forth in claim 15 further comprising the step of downscaling the reference image and the next image.

25. The system as set forth in claim 15 wherein the step of generating the object feature vector, the sample feature vectors and the search feature vectors further comprises the steps of:
   a) dividing the one or more object into a plurality of cells containing a plurality of pixels each having an intensity value;
   b) generating a histogram for each of the plurality of cells containing a plurality of bins for the intensity values of each of the plurality of pixels; and
   c) grouping the histograms for each of the plurality of cells to generate the object feature vector, the sample feature vectors or the search feature vector.

26. The system as set forth in claim 15 further comprising the step of applying the position of each of the one or more objects to the reference frame and the next frame and obscuring the image at the position of any of the one or more objects.

27. The system as set forth in claim 26 wherein the step of obscuring the image is performed by blurring the object.

28. The system as set forth in claim 26 wherein obscuring is performed by blacking out the object.

29. A system for tracking one or more object in a video comprising:
   a) means for receiving a reference image from the video containing a plurality of frames;
   b) means for selecting a position of the one or more objects in the reference image frame;
   c) means for generating an object feature vector for each of the one or more objects;
   d) means for generating a plurality of classification samples for each of the one or more objects feature vectors;
   e) means for receiving a next frame;
   f) means for generating a plurality of search samples for each of the one or more objects;
   g) means for updating the position of each of the one or more objects in the next frame by selecting the search sample with the lowest distance to the respective one or more objects feature vector as the position of each of the one or more objects.

30. The system as set forth in claim 29 further comprising means for updating each of the one or more objects feature vectors based on the updated position of each of the one or more objects, and using the means provided in e) to g) of claim 29 for processing each subsequent frame of the video.

31. The system as set forth in claim 29 wherein the means generating the plurality of classification samples further comprises:
   a) means for sampling the reference image around the one or more objects;
   b) means for generating a sample feature vector for each sample; and
   c) means for classifying each sample feature vector as representing either an object class or a background class.

32. The system as set forth in claim 29 wherein the means for generating a plurality of search samples further comprises:
   a) means for sampling the next frame around the one or more objects location in a previous frame;
   b) means for generating a search feature vector for each sample;
   c) means for classifying each search feature vector as representing either the object class or the background class; and
   d) means for calculating a vector distance between each of the search feature vector classified in the object class and the one or more objects feature vector.

33. The system as set forth in claim 32 wherein the means for classifying the search feature vector further comprises:
   a) means for calculating the vector distance between the search feature vector and each of the plurality of sample feature vectors;
   b) means for determining a plurality of nearest neighbor feature vectors to the search feature vector; and
   c) means for classifying the search feature vector as belong to either the object class or the background class as determined by the class with the greatest representation among the nearest neighbor feature vectors.

34. The system as set forth in claim 33 wherein the plurality of nearest neighbors feature vectors is limited to 3.

35. The system as set forth in claim 32 where in the means for calculating the vector distance is accomplished using the L2-norm of the vector difference.

36. The system as set forth in claim 29 wherein the means for selecting the position of the one or more objects in the reference image frame further comprises a means for detecting faces in the reference image.

37. The system as set forth in claim 29 further comprising a means for converting the reference image and the next image to grayscale.

38. The system as set forth in claim 29 further comprising a means for downscaling the reference image and the next image.

39. The system as set forth in claim 29 wherein the means for generating the object feature vector, the sample feature vectors and the search feature vectors further comprises:
   a) means for dividing the one or more object into a plurality of cells containing a plurality of pixels each having an intensity value;
   b) means for generating a histogram for each of the plurality of cells containing a plurality of bins for the intensity values of each of the plurality of pixels; and
   c) means for grouping the histograms for each of the plurality of cells to generate the object feature vector, the sample feature vectors or the search feature vector.

40. The system as set forth in claim 29 further comprising a means for applying the position of each of the one or more objects to the reference frame and the next frame and obscuring the image at the position of any of the one or more objects.

41. The system as set forth in claim 40 wherein the means for obscuring the image is performed by blurring the object.

42. The system as set forth in claim 40 wherein the means for obscuring is performed by blacking out the object.

* * * * *

UNITED STATES PATENT AND TRADEMARK OFFICE
CERTIFICATE OF CORRECTION

PATENT NO. : 10,810,433 B2  
APPLICATION NO. : 16/087456  
DATED : October 20, 2020  
INVENTOR(S) : Peiman Haghighat Page 1 of 1

It is certified that error appears in the above-identified patent and that said Letters Patent is hereby corrected as shown below:

On the Title Page

Item (72), Inventor name, change 'Pelman Haghighat' to 'Peiman Haghighat'.

Signed and Sealed this  
Twenty-second Day of December, 2020

Andrei Iancu  
*Director of the United States Patent and Trademark Office*